United States Patent [19]

Presby

[11] Patent Number: 4,712,858
[45] Date of Patent: Dec. 15, 1987

[54] LIGHTGUIDE ACCESS PORT

[75] Inventor: Herman M. Presby, Highland Park, N.J.

[73] Assignee: American Telephone and Telegraph Company, AT&T Bell Laboratories, Murray Hill, N.J.

[21] Appl. No.: 733,245

[22] Filed: May 13, 1985

[51] Int. Cl.[4] .......................... G02B 6/26; G02B 6/42
[52] U.S. Cl. ............................. 350/96.15; 350/96.16
[58] Field of Search ........................... 350/96.15, 96.16

[56] References Cited

U.S. PATENT DOCUMENTS

| 3,589,795 | 6/1971 | Miyazaki et al. | 350/96.15 |
|---|---|---|---|
| 3,611,359 | 10/1971 | Panerei et al. | 350/96.15 |
| 4,057,719 | 11/1977 | Lewis | 350/96.15 |
| 4,089,583 | 5/1978 | Auracher | 350/96.15 |
| 4,134,640 | 1/1979 | Auracher | 350/96.15 |
| 4,173,390 | 11/1979 | Kach | 350/96.16 |
| 4,176,908 | 12/1979 | Wagner | 350/96.15 |
| 4,243,297 | 1/1981 | Elion | 350/96.15 |

Primary Examiner—William L. Sikes
Assistant Examiner—Robert E. Wise
Attorney, Agent, or Firm—Volker R. Ulbrich; Gregory C. Ranieri

[57] ABSTRACT

An access port assembly (10) for a main lightwave transmission fiber (16) is made by machining a notch (26) into it by carbon dioxide laser nibbling to form notch faces (28, 30) which extend into the core region (18). The end face (32) of a second, receiving fiber (12) is placed in contact with the notch faces (28) to optically couple it to the core (18) of the main fiber (16). An optical epoxy cement (34) holds the two members in position and matches and index of refraction. A third, transmitting fiber (14) is similarly connected to the main fiber (16) in a second notch and is perpendicular to the receiving fiber (12).

9 Claims, 1 Drawing Figure

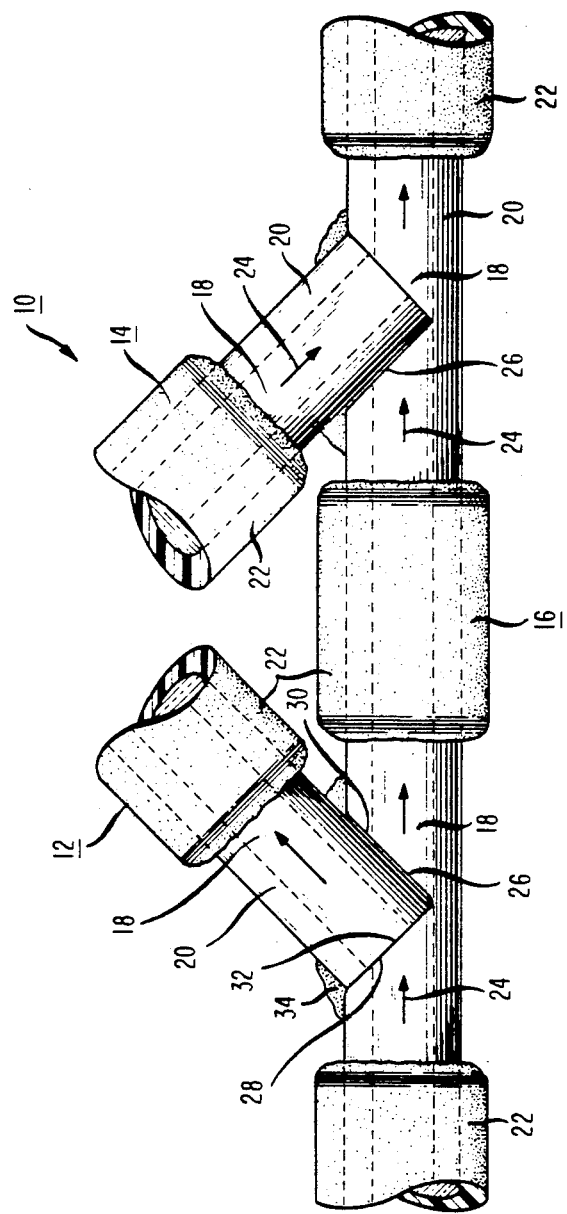

LIGHTGUIDE ACCESS PORT

TECHNICAL FIELD

The invention relates to access ports for lightwave signal transmission members.

BACKGROUND OF THE INVENTION

Lightguides for signal transmission are generally fused silica glass optical fibers having a central core region surrounded by a cladding. The cladding has a lower index of refraction than the core. A single, continuous fiber may be many kilometers in length. Typically, the cladding is protected by a jacket of plastic material, such as an epoxy acrylate. It is desirable, especially for communications systems purposes, to be able to access the signal in a main lightguide fiber bus by coupling receiving and transmitting fiber buses to it to form an access port at any particular desired location along its length.

One type of access port is a microbend receiving structure. After removal of the outer jacket, the main fiber bus is bent locally at a sufficiently sharp angle to permit a small part of the signal to escape from the core through the cladding. The light is then picked up by a sensor which amplifies the signal for further use. The requirement for amplification of the received signal is a disadvantage, since it requires additional active equipment. Another disadvantage is that due to the poor coupling, it is not feasible to transmit a signal into a lightguide via a microbend port.

Another type of access port is made by removing the jacket from a segment of the main fiber bus and abrading or otherwise removing the cladding along the segment to form an optical flat surface which can be mated to similar surfaces of the receiving and transmitting fiber buses for optically coupling them to the main fiber bus. A disadvantage of this method is that the formation of the mating flat surfaces requires relatively time-consuming abrasion processes which are especially difficult to adapt to field use.

SUMMARY OF THE INVENTION

In accordance with the present invention, a lightguide access port is formed by coupling the end face of the receiving and transmitting fibers directly to the core of the main fiber. This is accomplished by removing the jacket from a segment of the main fiber. A wedge-shaped portion of the main fiber, extending partly into the core, is then removed to form a notch with two notch faces. The end face of the receiving fiber is then bonded against at least one of the notch faces with index-matching optical cement to form an optical connection. The other transmitting fiber is similarly connected in a second notch. The resulting access port structure is relatively rugged, can be reliably and quickly formed, and results in effective coupling for both signal receiving and transmitting directly through the access port without the need for amplification.

BRIEF DESCRIPTION OF THE DRAWING

The drawing is an exaggerated schematic perspective view of a lightguide access port assembly in accordance with one embodiment of the present invention.

DETAILED DESCRIPTION

One example of the invention is the lightguide assembly 10 of the drawing, in which a receiving fiber bus 12 and a transmitting fiber bus 14 are connected to a main fiber bus 16. Each of the three buses 12, 14, 16 are fused silica glass optical fibers having a higher refractive index core 18, a lower refractive index cladding 20, and a plastic protective jacket 22. The jacket 22 has been removed along segments of the main bus 16, as well as at the end segments of the receiving and transmitting buses 12, 14. The travel directions of the signals in the buses 12, 14, 16 are indicated by the arrows 24.

Considering now in more detail the connection of the receiving bus 12 to the main bus 16, it is seen that a right-angled V-shaped notch 26 has been formed in the main bus 16 by the removal from it of a wedge of material which includes a portion of the core 18. This is preferably accomplished by means of a pulsed carbon dioxide laser, which is capable of nibbling away the material at a relatively rapid rate without damaging the remaining material. The process also leaves a smooth surface where cutting has taken place. Laser nibbling of this type is described in more detail in copending application Ser. No. 721,165 filed Apr. 4, 1985, entitled Laser Nibbling of Optical Waveguides and assigned to the same assignee as is the present invention. The notch 26 has two exposed faces 28, 30, either of which is suitable for optical coupling to the end face 32 of the receive bus 12. The precise depth that the notch 26 extends into the core 18 can be controlled by monitoring the signal intensity in the main bus 16 during the nibbling process. When the signal intensity is reduced by a few percent, it may be assumed that the notch 26 extends into the core 18 sufficiently to permit effective coupling to it through one of the notch faces 28, 30. The receiving bus 12 and the main bus 16 are rigidly fixed together by the application of ultra-violet light-curable epoxy optical cement 34 which has an appropriately matching index of refraction. The transmitting bus 14 is connected to the main bus 16 in a similar manner, but perpendicular to the receiving bus 12. Optical performance characteristics of the assembly 10 depend on the particular application. For example, in a local area network bus structure it is desirable to remove only a small amount of the light from the main bus, but to insert as much light as possible into it from a local transmitter. This is readily achieved with a relatively deep notch 26 in the main bus 16.

A pair of connection structures such as the assembly 10 of FIG. 1 can be used to provide an access port in a main bus for simultaneous receiving and transmitting capability. Such a connection structure can also be incorporated within an individual access port fixture which is intended for assembly to a main bus. The invention is suitable for single-mode and multi-mode lightguide structures.

The inherent geometry of the access port connection structure of the invention is such that the notch 26 physically receives the end of another lightguide particularly well when the optical surfaces 28, 30 of the notch 26 are perpendicular to each other. However, this is not a necessary condition for a useful structure. The notch 26 may be made narrower, and the lightguide to be received by it may then be made wedgeshaped at its end, so that it matches the notch. It may also be desirable that the two notches for the receiving and transmitting connections, respectively, have different angles between their notch faces and/or different depths in order to optimize their functions. The end segment of the lightguide which is to be connected to another lightguide may also have its cladding removed to improve the optical coupling.

What is claimed is:

1. An optical fiber access port structure, comprising:
   a first optical fiber having a core region and a cladding region and having a first notch extending through its cladding region and partially into its core region, the notch defining two notch faces at an angle to each other;
   a second optical fiber having a core region, a cladding region and at least one end face, the end face being positioned against one of the notch faces for optical coupling thereto, and longitudinal axes of said first and second optical fibers intersect at a substantially acute angle.

2. The structure as defined in claim 1 wherein the notch geometry is such that the notch faces intersect each other at a first notch angle along a line generally perpendicular to the longitudinal axis of the first optical fiber.

3. The structure as defined in claim 2 wherein the faces of the first notch are approximately perpendicular to each other.

4. The structure as defined in claim 3 wherein the end face of the second optical fiber is generally perpendicular to the longitudinal axis of the second optical fiber member.

5. The structure as defined in claim 3 wherein the second optical fiber member has a wedge-shaped end portion having flat first and second end faces and having a geometry matching the geometry of the first notch, so that it can be received by it with the end faces optically coupled to the faces of the first notch.

6. The structure as defined in claim 5 wherein the notch extends to the approximate center of the core region.

7. The structure defined in claim 1 wherein the first optical fiber comprises:
   a second notch extending through its cladding region and partially into its core region, the second notch defining two second notch faces intersecting each other at a second notch angle, and
   a third optical fiber having a core region, a cladding region, and at least one end face, the end face being positioned against one of the faces of the second notch for optical coupling thereto, and longitudinal axes of said first and third optical fibers intersect at a substantially acute angle.

8. The structure defined in claim 7 wherein the first and second notch angles are substantially equal.

9. The structure defined in claim 8 wherein the end faces of the second and third optical fibers are oriented with respect to each other at an angle approximately equal to the first and second notch angles.

* * * * *